United States Patent
Rautenberg et al.

(10) Patent No.: US 9,403,244 B2
(45) Date of Patent: Aug. 2, 2016

(54) METHOD FOR REPAIRING AN ABRADABLE COATING OF A COMPRESSOR OF A GAS TURBINE

(71) Applicant: Rolls-Royce Deutschland Ltd & Co KG, Blankenfelde-Mahlow (DE)

(72) Inventors: Joachim Rautenberg, Oberursel (DE); Juergen Duprè, Zeesen (DE); Eckart Uhlmann, Kiebitzreihe (DE); Bart Van Duikeren, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 196 days.

(21) Appl. No.: 14/368,685

(22) PCT Filed: Dec. 27, 2012

(86) PCT No.: PCT/EP2012/005381
§ 371 (c)(1),
(2) Date: Jun. 25, 2014

(87) PCT Pub. No.: WO2013/097944
PCT Pub. Date: Jul. 4, 2013

(65) Prior Publication Data
US 2015/0209915 A1 Jul. 30, 2015

(30) Foreign Application Priority Data

Dec. 28, 2011 (DE) .......................... 10 2011 122 549

(51) Int. Cl.
*F02C 7/00* (2006.01)
*B23P 6/00* (2006.01)
(Continued)

(52) U.S. Cl.
CPC .................. *B23P 6/002* (2013.01); *F01D 5/005* (2013.01); *F01D 21/003* (2013.01); *F02C 7/00* (2013.01);
(Continued)

(58) Field of Classification Search
CPC .......... B23P 6/002; B23P 6/005; B23P 6/007; F01D 5/005; F05D 2230/80; F05B 2230/80; Y10T 29/49318; Y10T 29/49732; Y10T 29/49734; Y10T 29/49723; Y10T 29/49725; Y10T 29/49726
See application file for complete search history.

(56) References Cited

U.S. PATENT DOCUMENTS 5,102,221 A * 4/1992 Desgranges ........... B23Q 5/027
356/241.1
5,644,394 A * 7/1997 Owens .................... B23P 6/002
15/324

(Continued)

FOREIGN PATENT DOCUMENTS

DE 102007035915 A1 4/2008
DE 102007029728 A1 1/2009
(Continued)

OTHER PUBLICATIONS

English Translation of International Search Report dated Jul. 1, 2014 from counterpart application No. PCT/EP2012/005381.
(Continued)

*Primary Examiner* — Jason L Vaughan
(74) *Attorney, Agent, or Firm* — Timothy J. Klima; Shuttleworth & Ingersoll, PLC

(57) ABSTRACT

The present invention relates to a method for repairing an abradable coating of a compressor of a gas turbine, where a worn abradable coating is repaired, where an analysis and/or selection of areas of the abradable coating to be repaired is conducted by means of a boroscope in the non-removed state of the gas turbine, where a tool is passed through at least one boroscope aperture of the gas turbine to the area to be repaired and the worn abradable coating is at least partially removed, where the removed material is extracted, where the area of the abradable coating to be repaired is cleaned and/or prepared for application of a repair medium, where a hardenable aluminum oxide-based repair medium is applied to the area to be repaired by means of a type of airbrush and then hardened, and where the area provided with the repair medium is subsequently mechanically treated.

8 Claims, 4 Drawing Sheets

Figure 1:
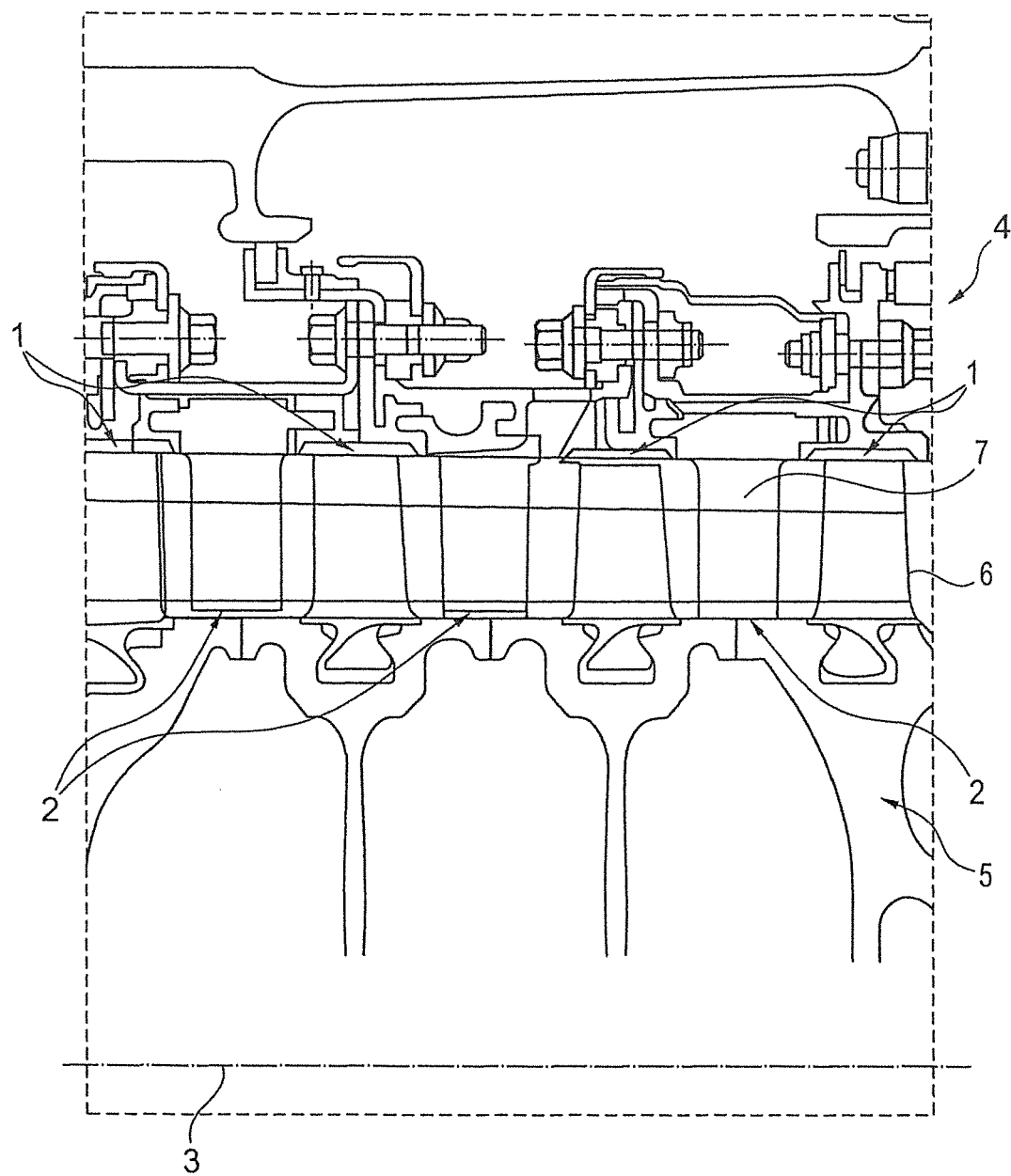

(51) Int. Cl.
  *F01D 5/00* (2006.01)
  *F01D 21/00* (2006.01)

(52) U.S. Cl.
  CPC ......... *F05B 2230/80* (2013.01); *F05B 2230/90* (2013.01); *F05D 2220/323* (2013.01); *F05D 2230/80* (2013.01); *F05D 2230/90* (2013.01); *Y10T 29/49238* (2015.01)

(56) References Cited

U.S. PATENT DOCUMENTS

| | | | | |
|---|---|---|---|---|
| 5,655,701 | A * | 8/1997 | Quattrocchi | B23P 6/007 228/119 |
| 6,485,780 | B1 * | 11/2002 | Sangeeta | C23C 10/02 29/889.1 |
| 6,542,230 | B1 * | 4/2003 | Luke | B23K 26/032 356/241.1 |
| 6,992,315 | B2 * | 1/2006 | Twerdochlib | F01D 5/005 250/330 |
| 7,094,450 | B2 * | 8/2006 | Nagaraj | C23C 4/00 29/889.1 |
| 7,097,539 | B2 * | 8/2006 | Moeller | B24B 19/14 451/356 |
| 7,509,735 | B2 * | 3/2009 | Philip | C23C 4/02 29/889.1 |
| 7,836,591 | B2 * | 11/2010 | Allen | B23P 6/007 277/412 |
| 8,039,773 | B2 | 10/2011 | Spallek et al. | |
| 8,640,531 | B2 * | 2/2014 | Remillard | F01D 21/003 73/112.01 |
| 9,085,060 | B2 * | 7/2015 | Clark | B24B 23/026 |
| 2005/0235493 | A1 | 10/2005 | Philip et al. | |
| 2006/0291998 | A1 * | 12/2006 | Dube | F01D 17/02 415/118 |
| 2007/0003412 | A1 * | 1/2007 | Le Beiz | B23P 6/002 415/173.4 |
| 2007/0248457 | A1 * | 10/2007 | Dodd | B23P 6/007 415/173.4 |
| 2009/0001059 | A1 | 1/2009 | Spallek et al. | |
| 2011/0302781 | A1 | 12/2011 | Dodd et al. | |
| 2012/0224048 | A1 * | 9/2012 | Trzcinski | F01D 5/005 348/85 |
| 2013/0167375 | A1 * | 7/2013 | Roesing | B23P 15/00 29/888.3 |

FOREIGN PATENT DOCUMENTS

| | | |
|---|---|---|
| DE | 102009060570 A1 | 7/2011 |
| EP | 1918524 A2 | 5/2008 |
| EP | 1975271 A2 | 10/2008 |
| WO | 0006336 A1 | 2/2000 |

OTHER PUBLICATIONS

International Search Report dated Apr. 18, 2013 from counterpart application No. PCT/EP2012/005381.
German Search Report dated Oct. 30, 2012 from counterpart German App No. 10 2011 122 549.1.

* cited by examiner

METHOD FOR REPAIRING AN ABRADABLE COATING OF A COMPRESSOR OF A GAS TURBINE

This application is the National Phase of International Application PCT/EP2012/005381 filed Dec. 27, 2012 which designated the U.S.

This application claims priority to German Patent Application No. DE102011122549.1 filed Dec. 28, 2011, which application is incorporated by reference herein.

This invention relates to a method for repairing an abradable coating of a compressor of a gas turbine, where at least one worn area of the abradable coating is repaired in the non-removed state of the gas turbine.

Abradable coatings for compressor bladings in aircraft engines or in stationary gas turbines are soft coatings intended to ensure the rubbing of the compressor blading in the static or rotating and harder opposite side. It is substantially Al—Si polyester, Al—Si graphite, Ni graphite or aluminum oxide coatings that are used They are used to achieve as low as possible a tip clearance and hence good compressor effectiveness. During operation of an engine, the abradable coatings become worn, either completely over the entire circumference or only partially. This leads to a loss in performance of the engine, caused by a deterioration of the compressor effectiveness, and to vibrations which in turn excite the compressor blading to uncontrolled vibrations and in the final analysis also to cracks in engine blades. For these reasons, the abradable coatings must be restored to their proper state as part of a repair measure.

To perform repair work, the engine must, according to the state of the art, be removed from the aircraft and transferred to dedicated and authorized workshops. These workshops require a level of equipment comparable to that for new part production facilities. In addition, the aircraft must be equipped with a replacement engine for the duration of the engine repair work.

The object underlying the present invention is to provide a repair method of the type specified at the beginning which while being simple to implement permits a cost-effective repair.

It is a particular object to provide solution to the above problems by a combination of the features described herein. Further advantageous embodiments will become apparent from the present description.

It is thus provided in accordance with the invention that a worn abradable coating is repaired in the non-removed state of the gas turbine. To do so, first an analysis and/or selection of areas of the abradable coating to be repaired is conducted by means of a boroscope in the non-removed state, where subsequently a tool is passed through at least one boroscope aperture to the area(s) to be repaired and those areas of the worn abradable coating which require repair are at least partially removed. The removed material is extracted here in accordance with the invention in order to prevent the material from spreading inside the gas turbine in an uncontrolled way. After this, that area of the abradable coating to be repaired is cleaned and/or prepared for application of a repair medium, in accordance with the invention, in particular to improve the adhesion of the repair medium. Then a hardenable repair medium is applied to the area to be repaired, and then hardened, with a hardenable aluminum oxide-based repair medium being applied to the area to be repaired by means of a kind of airbrush and then hardened, and with the area provided with the repair medium subsequently being mechanically treated.

It is particularly favourable when the area to be repaired is cleaned prior to application of the repair medium, and this can for example be done preferably by means of a cleaning fluid and subsequent drying.

To provide good accessibility and improved repairability, it is particularly favourable when the area to be repaired of a rotor of the gas turbine is positioned on top when a machine axis is arranged horizontally.

The repair medium consists of an aluminum oxide which in the hardened state has a similar heat expansion coefficient and a similar hardness and porosity to the original coating. The viscosity of the repair medium can be adjusted by admixing a thinner. The repair medium is supplied via a hose which can be integrated in a boroscope. Application can be performed by means of an airbrush. In accordance with the invention, the repair medium is applied in a preferred embodiment of the invention in several layers. The layer thickness is determined here preferably semi-automatically by controlling the applied quantity of repair medium for the respective coating section. Hardening is preferably achieved automatically under air by the effect of heat.

To dispense with the need to remove a gas turbine, visual inspections are conducted using a boroscope. This thin tube, which originates in medical endoscopy, is equipped in the inside with optical lenses which can be inserted into a cavity to be tested. Optic fibers enclose the optical unit and supply the light from a connected source to the point of inspection, from where a reflected image passes through the optical unit back to the eye of the beholder or into a camera with connected monitor. In this way, boroscopic testing supplies images of places that would never have been accessible without removing major components.

An aircraft engine has, for boroscopic investigation, a plurality of special apertures allowing the optical unit to be guided directly to the point to be tested, for example into any individual compressor stage. A single aperture is sufficient for the latter, since the blades to be tested can be rotated manually in front of the optical unit of the boroscope. Rigid components without direct access are inspected using a flexoscope. Instead of the rigid tube, this tool has a flexible hose in which glass fibers replace the optical lenses. With a working length of several meters, it can also be used to inspect components not reachable in a straight line.

The invention makes it possible to perform the repair of abradable coatings without removing the engine from the aircraft. For stationary gas turbines, the downtime is drastically reduced. To do so, miniaturized tools are supplied to the repair area via boroscope apertures located on the engine. The affected area is machined by means of a micro-cutter in conjunction with an extraction device. The area to be repaired is prepared such that good conditions are created for the adhesion of the repair medium. This can also be assisted by targeted spraying with special cleaning fluid and subsequent drying with clean air. Both (cleaning fluid and compressed air) are supplied using a boroscope.

After preparation of the repair area, the repair medium consisting of aluminum oxide particles can be applied. Application is by means of an airbrush. The repair medium and the compressed air are supplied in two separate lines to the rear of the tool and mixed inside the latter. The compressed air quantity is controlled by a valve. The supply of repair medium is controlled using a needle which varies the flow cross-section of the nozzle. If necessary, the needle is excited with ultrasound to prevent clogging of the nozzle.

The axial distance of the nozzle from the surface to be coated can be set by moving the guide bush. The nozzle is angled by several degrees relative to the rotational axis of the tool. The jet can be directed by rotating the tool about the rotational axis, so that the sprayed area is widened and the application precision increased. The jet pattern is dependent on the compressed air, on the needle position and also on the geometry of the nozzle. It is particularly favourable when the nozzle is interchangeable so that different nozzle geometries can be provided. To cater for the geometrical requirements of different compressor stages, several tools may be required.

Application is achieved in several layers. The rotor can be rotated during repair at a precisely controllable speed. This makes it possible to coat the rotor over its entire circumference. The multi-layer structure has the advantage that the repair area can be restored close to its final contour, thereby minimizing the effort for subsequent mechanical reworking. In addition, with thin layers droplet formation is prevented and vertical surfaces too can be coated. Further layers can be applied at brief intervals.

The repair medium should be hardened after coating by a moderate heat supply (electrical, fan or micro-burner). After hardening, a homogeneous coating is formed. If necessary, deposits in the vicinity of the repaired area must be removed.

By means of the method in accordance with the invention, it is thus possible to avoid expensive dismantling of aircraft engines, in particular replacement of an engine with a substitute engine, as is necessary in the event of such repair work according to the state of the art. The result of this is quite considerable advantages due to reduced work times and the cost savings they entail.

Figure 6:
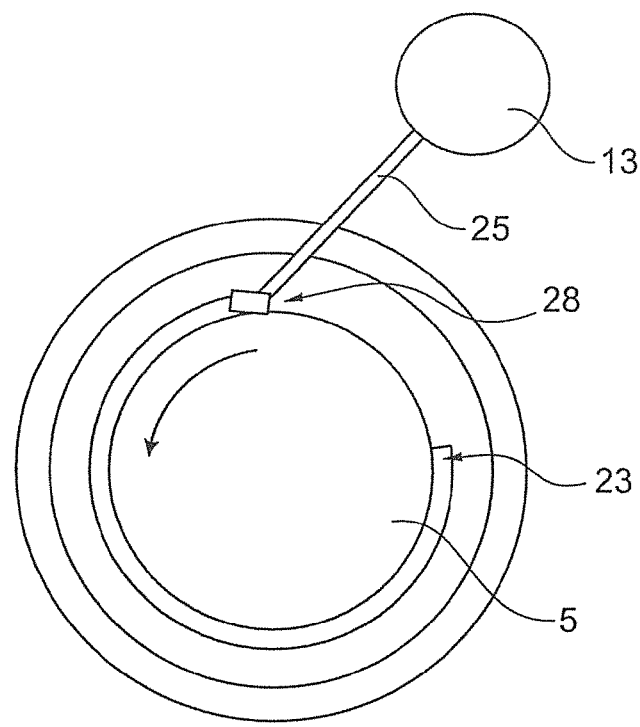
Figure 3:
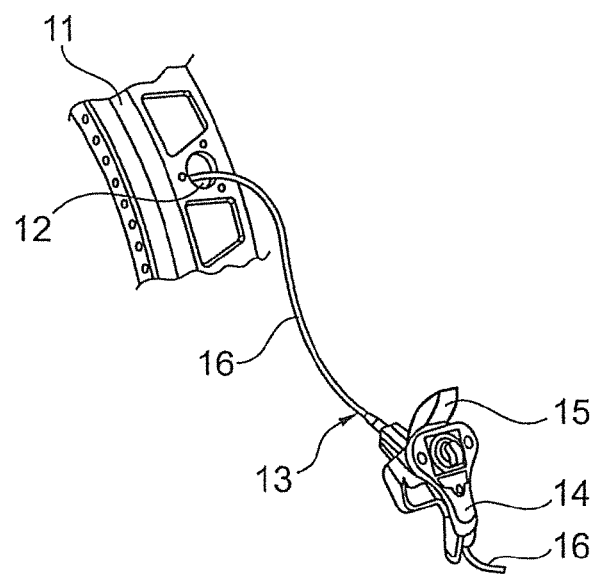
Figure 4:
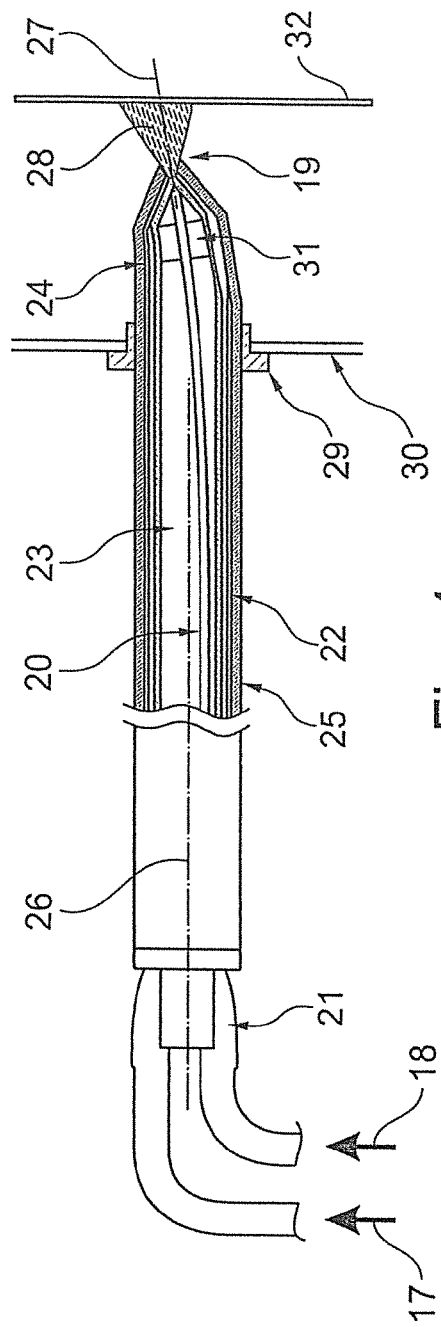
Figure 5:
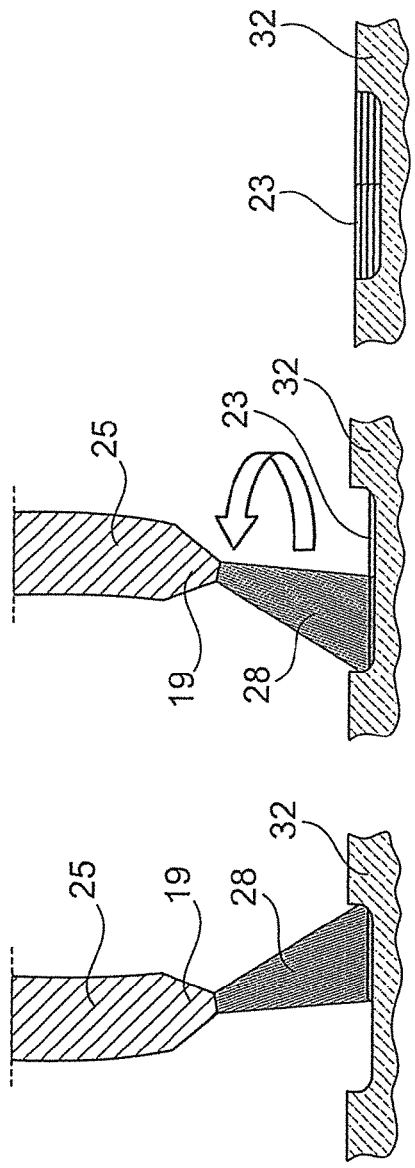

The present invention is described in the following in light of the accompanying drawing, showing an exemplary embodiment. In the drawing, FIG. 1 schematically shows a partial axial sectional view of a compressor of a gas turbine having abradable coatings, FIG. 2 shows a schematic representation of a gas-turbine engine with accessibilities for boroscope work, FIG. 3 shows a simplified schematic representation of the use of various boroscope equipment and units, FIG. 4 shows a simplified schematic representation of a coating tool, FIG. 5 shows a functional principle of tool rotation for controlling the nozzle and the jet for applying several layers, and FIG. 6 shows a simplified side view of the method in accordance with the present invention.

FIG. 1 shows a machine axis 3 about which a rotor 5 of a compressor is rotatable inside a casing 4. The rotor includes, in the standard design of a compressor, several rotor blades 6 whose free ends are facing abradable coatings 1 of the compressor casing 4. By analogy, the compressor casing 4 includes stator vanes 7 whose free and radially inward-facing ends are facing abradable coatings 2 of the rotor 5 (compressor drum). The abradable coatings come into contact with the free ends of the blades/vanes 6, 7 in order to minimize the tip clearance, and thus permit abrasion during operation of the gas turbine, as is known from the state of the art.

The repair method in accordance with the invention is performed using at least one boroscope, which is inserted through suitable apertures of the casing into the area of the blades/vanes 6, 7.

Figure 2:
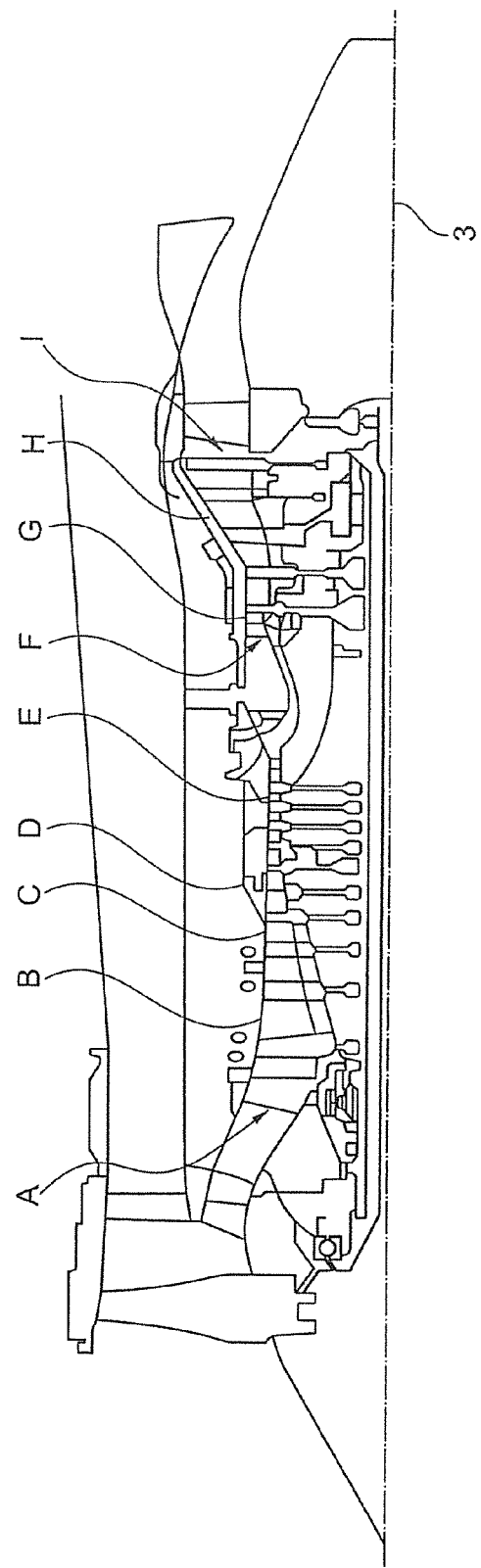

FIG. 2 schematically shows a partial axial sectional view of a gas-turbine engine with principal accessibilities for boroscope work. As can be seen here, access to a very wide range of areas of the gas-turbine engine is possible by the removal of attachments, by opening of access apertures and similar.

FIG. 2 shows the following elements/assemblies:

A High-pressure compressor rotor blades, stage 1, leading edge

B High-pressure compressor rotor blades, stage 1, trailing edge
   High-pressure compressor rotor blades, stage 2, leading edge C High-pressure compressor rotor blades, stage 3, trailing edge
   High-pressure compressor rotor blades, stage 4, leading edge D High-pressure compressor rotor blades, stage 5, trailing edge
   High-pressure compressor rotor blades, stage 6, leading edge E High-pressure compressor rotor blades, stage 9, trailing edge
   High-pressure compressor rotor blades, stage 10, leading edge F High-pressure turbine rotor blades, stage 1, leading edge
   High-pressure turbine stator vanes, stage 1, combustion chamber G High-pressure turbine rotor blades, stage 1, trailing edge
   High-pressure turbine rotor blades, stage 2, leading edge H High-pressure turbine rotor blades, stage 2, trailing edge
   Low-pressure turbine rotor blades, stage 1, leading edge I Low-pressure turbine rotor blades, stage 2, trailing edge.

FIG. 3 schematically shows the use of boroscope equipment in combination with the method in accordance with the invention. Here a part of a casing 11 is shown which is provided with a boroscope aperture 12 (access aperture). This can be provided by removal of a cover or by removal of a unit or similar. A manipulator 13 is introduced through the aperture 12 in order to remove and extract particles and/or to analyse them. A display and actuation unit, and/or the one control unit 14, permit by means of a monitor 15 checking and control of the work.

The manipulator 13 is linked to at least one hose 16 through which media can be supplied. The quantity of applied repair medium can be read off from a display. The control unit permits precise setting of the application speed.

It is understood that the representation in FIG. 3 shows the individual components and their mode of operation only in a very schematic form.

FIG. 4 shows a simplified schematic representation of a coating tool 25 in accordance with the invention. In the rear part of the tool 25, a repair medium 17 and the compressed air 18 are supplied via hoses 16. The supplied quantity of the repair medium in a nozzle 19 is controlled using a needle 20 by means of an actuator 21.

The nozzle 9 is located on the front of the tool 25. The repair medium 23 and the compressed air 22 are mixed inside the nozzle 19. The nozzle 19 is angled by several degrees relative to the center axis 26 of the tool 25, such that the jet 28 can be directed by turning the tool. The process can be observed by means of glass fibers 24 with integrated lighting.

FIG. 4 shows that the repair tool has a substantially cylindrical body whose front end area is, as already mentioned, inclined at an angle to a center axis 26 of the tool 25. The reference numeral 27 shows the center axis of the nozzle 19, corresponding to the center axis of the front end area of the tool 25. By rotating the tool 25, the exit angle of the jet 28 can be altered, so that the area to be sprayed can be suitably selected.

FIG. 4 furthermore shows a guide bush 29, arranged in a recess of an outer casing 30 of the compressor and/or the flow duct and used for guidance of the tool 25. The reference numeral 32 indicates an inner casing of the compressor and/or of the flow duct, onto which repair medium 23 is applied by means of the jet 28.

FIG. 5 shows how the repair medium 23 is applied in thin layers next to and above one another. The left-hand half of FIG. 5 shows the application of a first layer by means of the jet 28. Once this has been applied, the next layer is applied as shown in the center of FIG. 5. The right-hand half of FIG. 5 shows the finished state, in which several individual layers of repair medium 23 have been applied to restore an abradable coating.

FIG. 6 shows in a greatly simplified representation the application of repair medium 23 onto a rotor 25 in a side view. It can be seen here that repair medium can be applied using the tool 25 in layers by rotating the rotor.

LIST OF REFERENCE NUMERALS

1 Abradable coating of compressor casing
2 Abradable coating of rotor
3 Machine axis
4 Compressor casing
5 Rotor/compressor drum
6 Rotor blade
7 Stator
11 Casing
12 Access aperture/boroscope aperture
13 Manipulator
14 Control unit
15 Monitor
16 Hose
17 Supply for repair medium 23
18 Supply for compressed air 22
19 Nozzle
20 Needle
21 Actuator for needle 42
22 Compressed air
23 Repair medium
24 Glass fiber for optically observing the repair process
25 Repair tool
26 Center axis of tool 25
27 Center axis of nozzle 19
28 Jet
29 Guide bush
30 Outer casing of compressor flow duct
31 Guiding for needle 42
32 Inner casing of compressor/flow duct

What is claimed is:

1. A method for repairing an abradable coating of a compressor of a gas turbine, comprising:
    performing at least one chosen from conducting an analysis and selecting an area of the abradable coating to be repaired with a borescope while the gas turbine is still installed in an operating position,
    passing a tool through at least one borescope aperture of the gas turbine to the area of the abradable coating to be repaired and at least partially removing the worn abradable coating,
    extracting the removed worn abradable coating,
    performing at least one chosen from cleaning and preparing the area of the abradable coating to be repaired for application of a repair medium that is hardenable,
    providing that the at least one borescope aperture has an aperture central axis and that the at least one borescope aperture engages an exterior surface of the tool to prevent movement of the tool in a direction perpendicular to the aperture central axis while permitting rotation of the tool around the aperture central axis;
    applying the repair medium to the area to be repaired with an airbrush including a nozzle having a nozzle center axis fixed at an angle to a longitudinal axis of the tool, the nozzle supplying a jet of air and repair medium along the nozzle center axis at the fixed angle to the longitudinal axis such that a direction of the jet with respect to the gas turbine is selectively altered and controlled by rotating the tool around the longitudinal axis, thereby increasing an area covered by the jet with respect to the gas turbine by the rotating the tool around the longitudinal axis;
    providing that the area of the abradable coating to be repaired is on a rotor of the gas turbine and rotating the rotor of the gas turbine to generate a relative circumferential movement between the tool and the area of the abradable coating to be repaired to apply the repair medium;
    hardening the repair medium;
    wherein the repair medium is a mixture of aluminum oxide and a thinner.

2. The method of claim 1, and further comprising applying the repair medium in a plurality of layers.

3. The method of claim 1, and further comprising using a self-hardening or heat curable repair medium.

4. The method of claim 1, and further comprising conducting the method under visual control.

5. The method of claim 1, and further comprising cleaning the area of the abradable coating to be repaired by applying a cleaning fluid and subsequently drying the area of the abradable coating to be repaired.

6. The method of claim 1, and further comprising rotating the rotor to position the area of the abradable coating to be repaired at a top portion of the rotor when an engine axis of the gas turbine is arranged horizontally.

7. The method of claim 1, and further comprising removing the worn abradable coating with a micro-cutter and an extraction device.

8. The method of claim 1, wherein the at least one borescope aperture includes a guide bushing attached to the gas turbine, the guide bushing including an interior surface engaging the exterior surface of the tool to prevent movement of the tool in a direction perpendicular to the aperture central axis while permitting rotation of the tool around the aperture central axis.

* * * * *